Oct. 28, 1958 R. LIPSCOMB ET AL 2,857,745
SEPARATION OF FLUID MIXTURES
Filed April 12, 1945 3 Sheets-Sheet 1
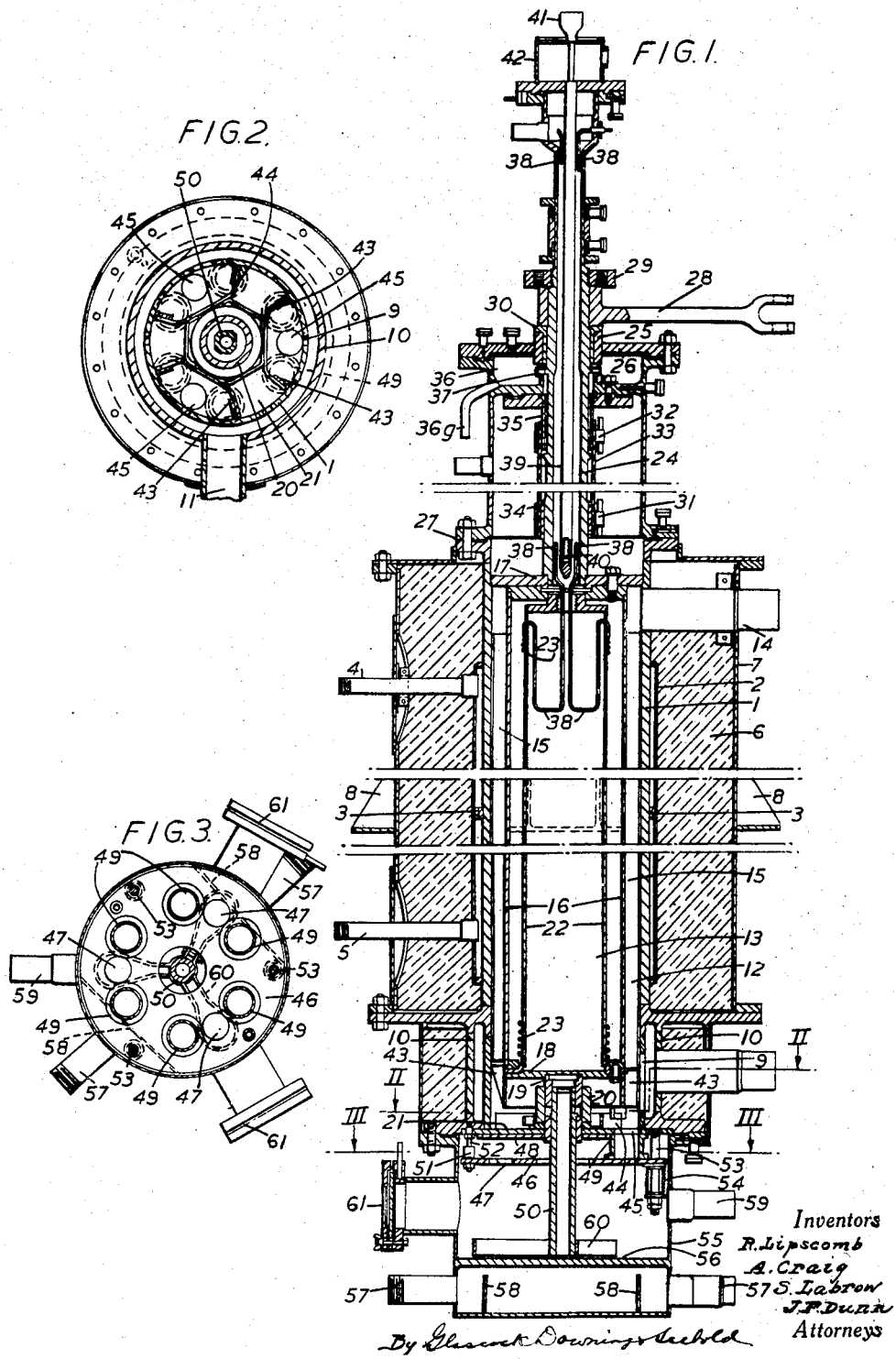
Inventors
R. Lipscomb
A. Craig
S. Labrow
J. P. Dunn
Attorneys

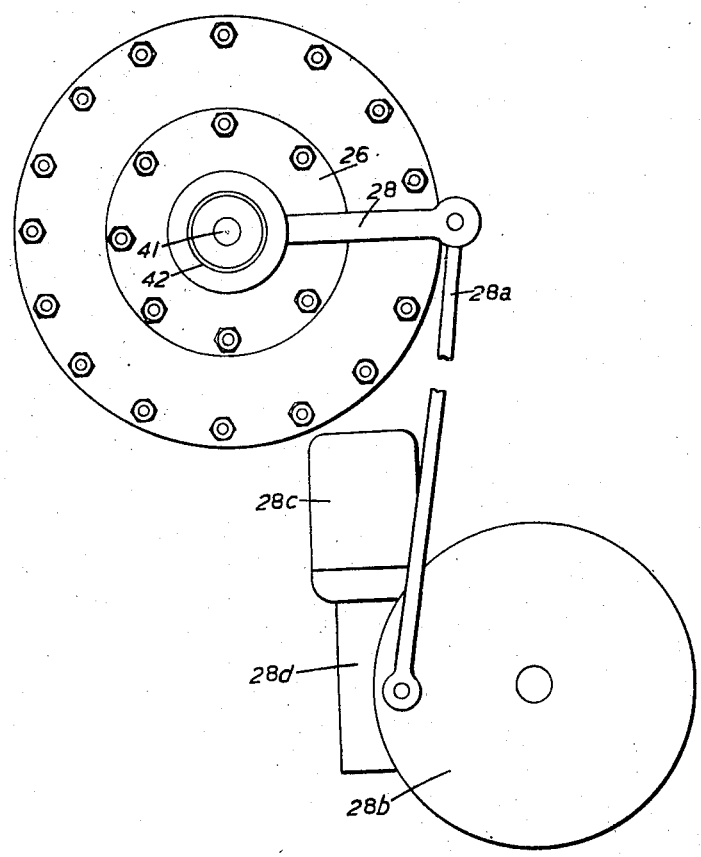

Oct. 28, 1958  R. LIPSCOMB ET AL  2,857,745
SEPARATION OF FLUID MIXTURES
Filed April 12, 1945  3 Sheets-Sheet 3

Inventors
R. Lipscomb
A. Craig
S. Labrow
J. F. Dunn
By Gleswick Downing Leichlt, Attorneys

United States Patent Office 2,857,745
Patented Oct. 28, 1958

2,857,745

SEPARATION OF FLUID MIXTURES

Robert Lipscomb, Billingham, Andrew Craig, Norton-on-Tees, and Schofield Labrow and James Findlay Dunn, Stockton-on-Tees, England, assignors, by mesne assignments, to the United States of America as represented by the United States Atomic Energy Commission Application April 12, 1945, Serial No. 587,972

16 Claims. (Cl. 62—40)

This invention relates to apparatus for separating fluid mixtures by the process of selective freezing, removal of the frozen ingredient, and reconversion of the removed frozen ingredient to fluid form. Operating conditions may require a pressure to be used within the apparatus, such that the one ingredient condenses directly into solid form which adheres to the walls of the apparatus and needs to be scraped off. It may also be essential to avoid contamination of the mixture by air, which is difficult to avoid if the pressure within the apparatus has to be maintained below atmospheric and yet provision has to be made for effecting scraping within the apparatus. Yet further difficulties are encountered if the nature of the medium makes it impossible to mount electrical windings, and lubricated bearings within the fluid space.

The object of the invention is to provide apparatus for carrying out the stated process in any or all of the stated operating conditions. The apparatus of the present invention comprises a main vessel in the form of a figure of revolution, at least a part of whose internal surface is cooled by an external jacket through which is circulated a suitable refrigerant, a scraper which is oscillatable about the axis of the vessel and having blades, sufficient in number and so arranged as to sweep at least the whole of the cooled internal surface of the vessel during each cycle of oscillation, a mechanism outside the vessel which oscillates the scraper shaft and a flexible sleeve which seals the passage of the shaft into the vessel and is able to withstand the torsional strain imposed upon it by the oscillation of the shaft.

The simplest arrangement of scraper blades to ensure scraping of the whole cooled area of the vessel wall is an equi-angular distribution of the blades around the axis.

Preferably the vessel is arranged with its axis vertical since the design is thereby simplified and it is easier to make provision for the withdrawal of the frozen material from the main fluid space into a heated chamber at the bottom in which the solid material can be reconverted to fluid form, in general to vaporous or gaseous form.

The frozen material must be withdrawn through means such as a trap by which leakage back from the heated chamber to the main fluid space is minimised.

Advantageously the trap may include a receiver (or a plurality of receivers operating in parallel) adapted to communicate alternately with the main vessel and the heated chamber, and actuated in synchronism with the oscillation of the scraper. With the preferred vertical arrangement of the main axis, each receiver may consist of a pocket or chamber extending vertically through a member oscillated with the scraper, the pocket thereby being brought alternately into register with an opening in the bottom of the main vessel and with an opening in the top of the heated chamber. Or each receiver may consist of a pocket in a multipocketed wheel (of which there may be a plurality operating in parallel) rotated step by step within a casing, each pocket communicating in turn with an inlet to the casing from the bottom of the main vessel and with an outlet from the casing to the top of the heated chamber, the arrangement of the wheel and casing being such that there is at no time a direct path from inlet to outlet, the wheel and its casing being enclosed within a valve chamber which is partitioned off from the heated chamber except for the outlet which must open through the partition.

A hermetic trap is not essential because if the pressure in the heated chamber is maintained slightly above the pressure in the main fluid space, leakage does not cause contamination, but merely loss of efficiency. In the case of the multipocketed wheel trap, provision can be made for surrounding the valve casing by a chamber containing an inert diluent whereby any leakage can be arranged to take place into the valve casing along the spindle by which the wheel is rotated, thereby tending to reduce attack on the motion work in cases where the separated medium is corrosive.

One surface of the above mentioned flexible sleeve is subjected to the pressure in the main vessel and therefore if this pressure is markedly different from atmospheric, it is preferable to provide means for subjecting the other surface of the sleeve to a pressure substantially equal to that in the main vessel so that there is no tendency to burst or compress the sleeve which in view of the torsional strain imposed upon it, has to be of rubber or similar highly resilient material.

To prevent atmospheric contamination, preferably all dismountable joints between parts which in use do not move relative to one another are sealed by two packing rings or the like in series, the space between the rings being either held evacuated or supplied with an inert gas, for instance the same gas as the non-freezing gas of the mixture itself, at a slightly higher pressure than atmospheric. Any permanent joints are preferably welded.

The invention comprises a number of further features, the nature of which will appear from the following description of two preferred examples of construction embodying the invention, reference being had to the accompanying drawings in which Fig. 1 is a vertical sectional elevation of the first example, showing the complete apparatus.

Fig. 2 is a cross section taken on the line II—II of Fig. 1.

Fig. 3 is a cross section taken on the line III—III of Fig. 1.

Fig. 4 is a diagrammatic plan view.

Figure 6:
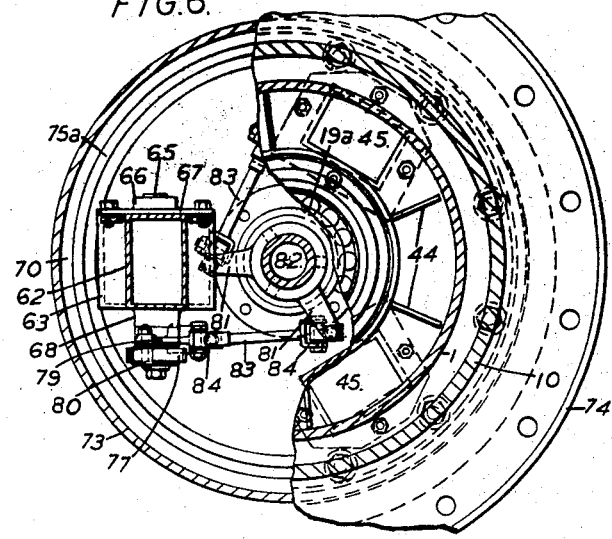
Fig. 6 is a cross section taken on the line VI—VI of Fig. 5.

It is to be understood that for clarity the positions of pipe connections and the like in the elevational views differ from the positions shown in the cross sections as regards their angular disposition around the main axis of the apparatus. In any event these dispositions may be varied to suit local conditions.

Referring now to the drawings the main vessel comprises a cylindrical shell 1 with a cooling jacket 2 surrounding the greater part of it. To stiffen the main shell during the final machining operations a number of bands (such as 3) may be welded round the outside and these may also act as spacers and supports for the cooling jacket. The cooling medium may be circulated in the jacket through pipes 4, 5 by pumps not shown and its temperature maintained by an external cooler not shown. The main shell and jacket may be surrounded by lagging 6 and the lagging casing 7 may be made sufficiently robust to take supporting brackets such as 8 carrying the whole apparatus.

The mixed gas enters the shell at the bottom end through ports 9 in the main shell 1 leading from an annular chamber formed around the lower end of the shell 1 by a wall 10 and into which opens the supply pipe 11. The coolant jacket 2 is terminated above this chamber so that the wall temperatures in the annulus are not sufficiently low to cause condensation of the product. The lagging casing 7 may be fitted with hand holes not shown so that the heat flow may be adjusted by varying the thickness of the lagging until optimum running conditions are established.

The gas passes up through the annular space 12 between the shell and the scraper indicated generally at 13, depositing the condensible fraction on the cold walls as a solid while the non-condensible fraction is drawn off at the top end through a branch 14, for instance by a vacuum pump not shown, and may be discharged or otherwise dealt with.

The scraping blades 15 are equally pitched round the axis of the shell and may be arranged to scrape on both the forward and backward motions. For this purpose the blades may advantageously comprise straight, axially-set lengths of rectangular section material, placed edge-on to the shell and slightly hollowed out, as by grinding, on their edges facing the shell. The parts are preferably so dimensioned that in operation, when steady temperature conditions have been reached, there is a small but definite clearance between the blade edges and the shell wall. A suitable number of blades is six and the angle of oscillation may then conveniently be between 60° and 70° so that the whole wall is swept at each oscillation.

The blades may be welded along their full length to a tubular support 16 which is centred at the top end in the main shell and also attached to the driving mechanism by a flange disc 17. At the bottom end the scraper support may be closed by a bolted disc 18, and centred in the shell by a collar 19 working in a bearing-like guide 20 built up from the bottom end plate 21 of the main shell. Any relative expansion and contraction movements between the shell and the scraper are taken up in this guide.

To prevent any chance of the blades freezing to the shell, and to ensure that no condensation of the product takes place on the scraper from which it could not be removed, a certain amount of heat may be applied to the scraper support 16. To do this a heater tube 22 may be mounted inside the scraper support and oscillated with it. This heater tube is wound with electrical resistance wire 23 and by controlling the current supply, the temperature of the tips of the scraper blades may be adjusted so that they are just above the freezing point. As the greatest quantity of product is deposited at the bottom end of the shell the resistance may be wound to give the greatest heat at the lower end of the scraper.

The bottom end of a hollow driving shaft 24 is secured to the above mentioned flange disc 17, while the top end is supported in an oil-sealed gas-tight bearing 25 carried by a plate 26 closing the upper end of the main shell. This is some distance above the flange disc 17 and the shell may have a flange joint 27 just above the disc to facilitate assembly of the apparatus. Above the bearing 25 an operating crank 28 is keyed to the shaft. The weight of the scraper mechanism is transmitted through the shaft 24 to a collar 29 resting on the crank 28, the end-thrust rubbing surfaces being formed on the crank and a flange 30 on the aforesaid bearing. The crank 28 is linked by a connecting rod 28a to any convenient driving mechanism which will give it the requisite stroke, such as a rotating crank 28b, driven at a suitable speed, as by an electric motor 28c and gearing 28d.

The shaft is sealed to the shell by a rubber sleeve 33 fixed at its lower end by a clip 31 to a shoulder 34 on the shaft above the flange disc 17 and at its upper end by a clip 32 to a flange piece 35 which in turn is bolted to the main shell beneath the bearing 25. The space 36 between the bearing and the flange piece may constitute an oil drainage chamber which collects surplus oil from the bearing, the shaft being fitted with a deflector 37 to prevent oil entering the sleeve and the chamber being drained to an external receiver by a pipe 36g. The gas-tight bearing enables the pressure in the drainage chamber and the space between the sleeve and the shaft to be held very slightly above that within the main vessel to prevent excessive stressing of the sleeve 33 due to high differential pressures across the rubber.

The electric connections 38 to the scraper support heater 23 pass down through the shaft 24 and they dissipate a certain amount of heat. To prevent this, combined with thermal circulation from the inside of the heater tube 22, from raising the temperature sufficiently to damage the rubber sleeve 33, a cooling tube 39 closed at the bottom end may be disposed within the shaft 24 and cooling water circulated by the aid of a second tube 40 within the tube 39, and suitable top connections comprising in the illustrated example an inlet funnel 41 leading to tube 39 and an outlet compartment 42 into which the tube 39 opens.

As an extension to the bottom end of the main scraper support 16, conveniently bolted to it below its bottom closure 18, there is an arrangement of short blades 43 constituting product chutes and also designed to scrape the wall of the main shell 1. There may be half as many short blades 43 and chutes as there are main scraper blades 12, i. e. three with six main blades. As the wall temperature in this region is not intended to be cold enough to condense out the gas, the main duty of these short blades is only to remove any of the scraped product which may tend to cling to the wall. The blades 43 serve to collect the product from all six sections of the scraper and gather it at three points. The blades 43 in turn engage movable sweeping means 44 in the form of a loosely pivoted spider, the arms of which on being moved urge the product towards and through a gas seal to the heated chamber in which it is gasified.

In the example shown in Figs. 1 to 4, the trap is of the kind in which each receiver extends vertically through member oscillated with the scraper. The bottom end plate 21 of the main shell has three holes 45 arranged in the regions in which the product is collected.

Below this plate is a lower plate 46 having three holes 47 pitched midway round from those in the bottom plate. Running between these two fixed plates is a third plate 48 oscillating with the scraper frame and having six receivers in the form of tubes 49 fixed to it. The oscillating motion may be transmitted from the above mentioned collar by a sliding engagement thereof over a square end on a shaft 50 carrying the third plate 48. The tubes 49 are yieldingly pressed between the two fixed plates 21, 46 while being slidable thereover to provide a gas seal. For instance the lower plate may as shown be slidable vertically by guides 51 working on short rods 52 projecting downwardly from the bottom end plate 21, and longer rods 53 projecting from the plate 21 may pass through the lower plate 46 and carry abutment shoulders for helical compression springs 54 bearing upwardly against the lower plate. The spring pressure may be adjustable so that a minimum pressure consistent with a good gas seal can be used. In operation a tube 49 comes under a hole 45 in the bottom end plate 21 and fills up with product. This tube travels across the hole and finally clears it at which time it is full of solid product. The tube then starts to come over a hole 47 in the lower fixed plate 46 and the product is discharged to the gasifying chamber 55. It should be noted that the tube 49 is quite clear of the hole 45 in the bottom end plate before it starts to open to the hole 47 in the lower fixed plate 46 and there is thus no question of gas blowing back from the gasifying chamber to the main shell through the tubes. By having six tubes 49 with three filling holes 45 and three discharge holes 47 the operation of the trap is substantially continuous and there is practically no build up of product in the main shell 1. The product discharged through the holes into the gasifying chamber 55 falls on to the bottom plate 56 of the heated chamber. This plate 56 is heated in any suitable way, for instance by blowing hot air across its underside by means of tubes 57 and baffles 58, and the product is thereby gasified and drawn off through an outlet branch 59 for further treatment. As all the product is discharged on the bottom plate 56 of the heated chamber 55 in three heaps, a distributor frame 60 may be fixed to the shaft 50 of the tube plate 48 and oscillated with it to spread the product over the surface of the heated plate 56. The pressure in the gasifying chamber 55 is preferably maintained higher than in the main shell 1 so that any leakage which occurs at the gas seals is of pure product back to the main shell 1 and does not cause any contamination of the product with non-condensable gas. The heated chamber may if desired be provided with one or more glazed windows 61.

Figure 5:
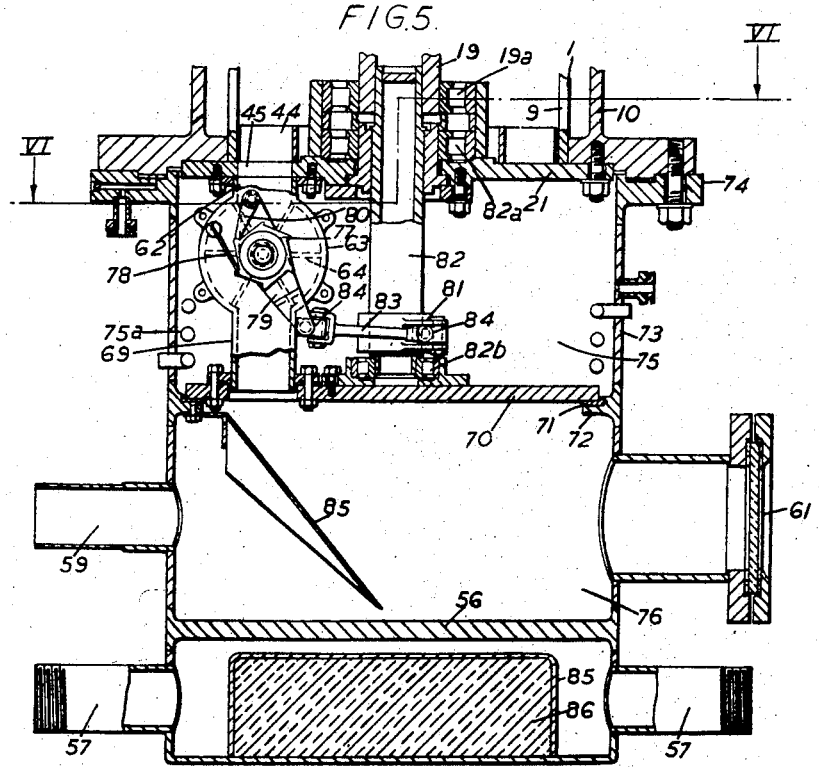
Fig. 5 is a vertical section, on a larger scale, of the second example, those parts which are identical with the first example being for the greater part omitted.

In the example shown in Figs. 5 and 6, the trap is of the kind in which each receiver is a pocket in a multi-pocketed wheel, which is conveniently in the form of a hub with radial blades.

In this example, there are, just as in the first example holes 45, for example three holes 45 in the plate 21 through which the product is discharged by the effect of the loose sweeper 44, but in this case the holes 45 are of rectangular form as shown in Fig. 5. Beneath the plate 21, in register with the holes 45, are flange-bolted ducts 62 constituting inlets to cylindrical bore casings 63 in which multi-bladed wheels 64 are rotatable, the blades closely sweeping the bores of the casings. Each wheel is provided with two journals borne in bearings one journal 65 being borne in a bearing 66 formed on an end plate 67 on the casing, and the other in a bearing 68 formed on the integral end of the casing. From the undersides of the casings, outlet ducts 69, of the same section as the inlets, extend down to a partition plate 70 over openings in which they are flange-bolted.

In the example shown, each wheel has six blades, and the inlet ducts 62 are diametrically opposite the outlet ducts 69, the actual inlet and outlet ports in the casing each spanning just under 60°. With this arrangement there will always be two blades on each side between the inlet and outlet. The partition plate 70 seats round its rim on a soft packing ring 71 carried by a shoulder 72 within a cylindrical housing 73 hermetically secured, as by a packed bolted flange joint 74, below the bottom end plate 21, thus dividing the housing 73 into a valve chamber 75 and a heated chamber 76. This separation of the valve chamber from the heated chamber assists in avoiding undue heating of the valve chamber and the mechanism (described below) located therein, but if necessary or desirable, for instance if the frozen material to be handled is one which tends to become sticky or to lose its free-flowing properties on heating-up slightly, cooling coils 75a may be provided in the valve chamber to minimise the effect of heat conduction from the heated chamber.

One journal of each six-bladed wheel is extended outside its bearing 68 and carries a six-toothed ratchet wheel 77. A spring back-stop pawl 78 is provided, mounted on the casing end. A lever 79 is borne on each extended journal, between the bearing 68 and the ratchet wheel 77. An operating pawl 80, coacting with the ratchet wheel, is pivoted to one end of the lever, while the other end of the lever is coupled by a link 83 to an arm 81 on the lower end of a vertical shaft 82 which has a square end having sliding engagement in the collar 19 projecting from the bottom end plate 18 of the scraper support 16. The several arms 81 may be integral with a common sleeve keyed to the shaft. Since these arms oscillate in the horizontal plane while the levers oscillate in vertical planes, the links 83 must be universally jointed at both ends, for instance by Hooke's joints 84.

As compared with Figs. 1 to 4, in this example, on account of the loads imposed, the shaft 82 which corresponds to the shaft 50 of Fig. 1, is journalled in roller bearings 82a, 82b, while the collar 19 is also journalled in a roller bearing 19a instead of in a bearing-like guide.

It will be apparent that as the scraper is oscillated the levers 79 will be rocked through the agency of the arms 81 and links 83, the parts being so proportioned that the wheels 77 are stepped forward one tooth at each oscillation. The actual stepping will occupy not more than one half of the total time of an oscillation and the parts are also so proportioned and located that during its stationary periods, as shown in Fig. 5, each wheel has one pocket formed between two adjacent blades in register with the inlet duct 62 and another pocket in register with the outlet duct 69.

To spread the discharged material over the bottom plate 56 of the heated chamber, an inclined, perforated, distributor chute 85 may be arranged in the heated chamber below the outlet 69 from each valve. The bottom plate 56 is shown as heated as described above with reference to Figs. 1 to 4, that is to say by hot air blown through tubes 57. In this example a hollow baffle 85 enclosing insulation 86 is provided to direct the hot air.

We claim:

1. Apparatus for separating fluid mixtures by selective freezing in a closed vessel cooled by means of a jacket, comprising a closed main vessel having its internal surface in the form of a figure of revolution, an inlet to and outlet from said vessel, a cooling jacket extending over at least a part of the length of said vessel, a shaft journalled axially of said vessel and projecting thereinto, means external to said vessel for oscillating said shaft on its axis, a flexible sleeve sealing the passage of said shaft into said vessel and able to withstand the torsional strain imposed upon it by the oscillation of said shaft, scraper blades fast to said shaft with their edges slightly clearing the internal surface of said vessel, the number, length and spacing of said blades, and the amplitude of oscillation of said shaft being such that at least the whole of the internal surface of the jacketed part of said vessel is swept by the blades during each cycle of oscillation, a closed chamber, an outlet from said chamber, means for withdrawing from said vessel frozen material scraped from its walls by said blades and feeding it into said chamber without substantial passage of gas between said vessel and said chamber, and means for heating said chamber.

2. Apparatus as set forth in claim 1 wherein said withdrawing means includes a receiver for scraped-off frozen material adapted to communicate in substantially leakproof fashion alternately with said vessel and said chamber for withdrawing frozen material from said vessel and discharging it into said chamber.

3. Apparatus as set forth in claim 1 also comprising means for heating said blades sufficiently to avoid freezing of their working edges to the internal surface of said vessel.

4. Apparatus as set forth in claim 1 also comprising means for heating said blades sufficiently to avoid freezing of their working edges to the internal surface of said vessel, and means for cooling the portion of said shaft which is surrounded by said sleeve.

5. Apparatus as set forth in claim 1 also comprising a hollow support securing said blades to said shaft, a heater tube within said support, an electric resistance wire wound upon said heater tube, and leads extending from said wire and emerging outside said vessel.

6. Apparatus as set forth in claim 1 also comprising means for applying to that surface of said flexible sleeve which is not exposed to the internal pressure in said vessel, a pressure substantially equal to said pressure.

7. Apparatus as set forth in claim 1 also comprising a chamber outside said vessel and surrounding said shaft, a tubular extension from said chamber extending into said vessel and also surrounding said shaft, said sleeve being fixed at one end to said extension and at the other to said shaft at a point inside said vessel so that the outside of said sleeve is exposed to the pressure in said vessel, means making a substantially gas-tight joint between said chamber and said shaft, and a connection to said chamber whereby the pressure therein and thereby the pressure on the inside surface of said sleeve can be regulated.

8. Apparatus for separating fluid mixtures by selective freezing, comprising a closed main vessel having its internal surface in the form of a figure of revolution, an inlet to and outlet from said vessel, a cooling jacket extending over at least part of the length of said vessel, a shaft journalled axially of said vessel, means for oscillating said shaft, scraper blades fast to said shaft with their working edges slightly clearing the internal surface of said vessel, the number, length and spacing of said blades and the amplitude of oscillation of said shaft being such that at least the whole of the internal surface of the jacketed part of said vessel is swept by said blades during each cycle of oscillation, a closed chamber below said vessel, an outlet from said chamber, means for heating said chamber, enclosed means including a receiver located beneath the bottom of said vessel, said enclosed means being movable between positions in one of which the receiver registers with an opening in the bottom of said vessel and thereby collects scraped-off frozen material by gravity and in the other of which it closes said opening and the receiver discharges the frozen material into said chamber by gravity, said enclosed means constituting a substantially gas-tight trap between said vessel and said chamber, and means for moving said receiver between said positions in synchronism with the oscillations of said shaft.

9. Apparatus for separating fluid mixtures by selective freezing, comprising a closed main vessel having its internal surface in the form of a figure of revolution, an inlet to and outlet from said vessel, a cooling jacket extending over at least part of the length of said vessel, a shaft journalled axially of said vessel, means for oscillating said shaft, scraper blades fast to said shaft with their working edges slightly clearing the internal surface of said vessel, the number, length and spacing of said blades and the amplitude of oscillation of said shaft being such that at least the whole of the internal surface of the jacketed part of said vessel is swept by the blades during each cycle of oscillation, a plate fitting closely but slidably beneath the bottom of said vessel, substantially gas tight means coupling said plate to said shaft whereby said plate is oscillated with said shaft, a plurality of open ended vertical tubes carried by said plate, a stationary plate yieldingly pressed against the undersides of said tubes, each tube registering during its movement alternately with an opening in the bottom of said vessel and with an opening in said stationary plate, a closed chamber enclosing said plates and tubes, an outlet from said chamber, and means for heating said chamber.

10. Apparatus as set forth in claim 8 wherein twice as many vertical tubes are provided as there are openings in the bottom of said vessel.

11. Apparatus as set forth in claim 8 also comprising movable sweeping means resting on the bottom of said vessel, and means for coupling said movable sweeping means to said shaft, whereby said movable sweeping means is oscillated and urges scraped frozen material towards and through said openings in the bottom of said vessel.

12. Apparatus as set forth in claim 8 also comprising a distributor at the bottom of said chamber carried by said coupling means, whereby frozen material discharged on to the bottom of said chamber is spread thereover.

13. Apparatus for separating fluid mixtures by selective freezing, comprising a closed main vessel having its internal surface in the form of a figure of revolution, an inlet to and outlet from said vessel, a cooling jacket extending over at least part of the length of said vessel, a shaft journalled axially of said vessel, means for oscillating said shaft, scraper blades fast to said shaft with their working edges slightly clearing the internal surface of said vessel, the number, length and spacing of said blades and the amplitude of oscillation of said shaft being such that at least the whole of the internal surface of the jacketed part of said vessel is swept by the blades during each cycle of oscillation, a casing beneath said vessel, a closed chamber beneath said casing, an outlet from said chamber, means for heating said chamber, a casing inlet leading from an opening in the bottom of said vessel, a casing outlet leading into said casing, an outlet from said chamber, means for heating said chamber, a casing inlet leading from an opening in the bottom of said vessel, a casing outlet leading into said chamber, a multi-pocketed wheel closely fitting within and rotatably journalled in said casing, and means for rotating said wheel step by step in synchronism with the oscillations of said shaft, the arrangement of the wheel and casing being such that each pocket communicates alternately with the casing inlet and casing outlet, and that there is at no time a direct path from casing inlet to outlet.

14. Apparatus as set forth in claim 13 comprising a plurality of multipocketed wheels and casings operating in parallel and a partition separating a valve chamber in which said casings are located, from said closed chamber.

15. Apparatus as set forth in claim 13 also comprising a ratchet wheel carried by said multipocketed wheel, a lever pivoted coaxially with said ratchet wheel, a pivot carried by said lever coacting with said ratchet wheel, an arm oscillated by said shaft, and a link coupling said lever to said arm, whereby said ratchet wheel is stepped on at each oscillation of said shaft.

16. Apparatus as set forth in claim 13 also comprising a partition separating a valve chamber in which said casing is located, from said closed chamber, and cooling means in said valve chamber.

References Cited in the file of this patent
UNITED STATES PATENTS

| | | |
|---|---|---|
| 505,359 | Hill | Sept. 19, 1893 |
| 1,369,053 | Scott | Feb. 22, 1921 |
| 1,807,139 | Volodimirov | May 26, 1931 |
| 2,215,968 | Livingston | Sept. 24, 1940 |